United States Patent

Milohanic

Patent Number: 5,448,943
Date of Patent: Sep. 12, 1995

[54] APPARATUS FOR PREPARING FOLDED ARTICLES FROM SHEET MATERIALS

[75] Inventor: Slobodan Milohanic, Aengelholm, Sweden

[73] Assignee: Nestec S.A., Vevey, Switzerland

[21] Appl. No.: 17,628

[22] Filed: Feb. 12, 1993

[30] Foreign Application Priority Data

Mar. 16, 1992 [EP] European Pat. Off. ............ 92104463

[51] Int. Cl.⁶ .............................................. A21C 9/04
[52] U.S. Cl. .................... 99/450.1; 99/450.6
[58] Field of Search .............. 99/450.6, 450.2, 450.1, 99/450.7, 353, 352, 355, 356; 425/335, 371, 391, 394, 329, 363, 340, 343, 320, 321; 426/501, 504, 502, 503, 275, 27

[56] References Cited

U.S. PATENT DOCUMENTS

| | | | |
|---|---|---|---|
| 3,953,613 | 4/1976 | Morgenthaler et al. | 99/450.1 |
| 4,516,487 | 5/1985 | Madison et al. | 99/450.6 |
| 4,640,670 | 2/1987 | Svengren et al. | 99/450.7 |
| 4,821,634 | 4/1989 | Swanson | 99/450.1 |

FOREIGN PATENT DOCUMENTS 7808686 2/1980 Netherlands ........................ 99/450.6

Primary Examiner—David A. Scherbel
Assistant Examiner—Reginald L. Alexander
Attorney, Agent, or Firm—Vogt & O'Donnell

[57] ABSTRACT

Two conveyors and a cutting device are employed to prepare and cut folded articles from plastic sheet material. The first conveyor has a conveying run for advancing a sheet of foldable plastic material, and the second conveyor has a conveying run which is positioned above the first conveyor conveying run and which extends for a length of the first conveyor conveying run. A first end of the second conveyor run is positioned intermediate of upstream and downstream ends of the first conveyor conveying run and is spaced a distance from the first conveyor conveying run. The cutting device is positioned above the first conveyor conveying run at a position intermediate of the first conveyor conveying run downstream end and the second conveyor first end for cutting a sheet of plastic material advanced lengthwise on the first conveyor conveying run so that a portion of a width of the sheet between side edges is separated from the sheet. The remainder of the sheet from which the portion has been cut is taken up by the second conveyor conveying run and which is driven to advance and recede from the first end and the sheet advanced on the first conveyor conveying run is folded over onto itself prior to the cutting.

3 Claims, 1 Drawing Sheet

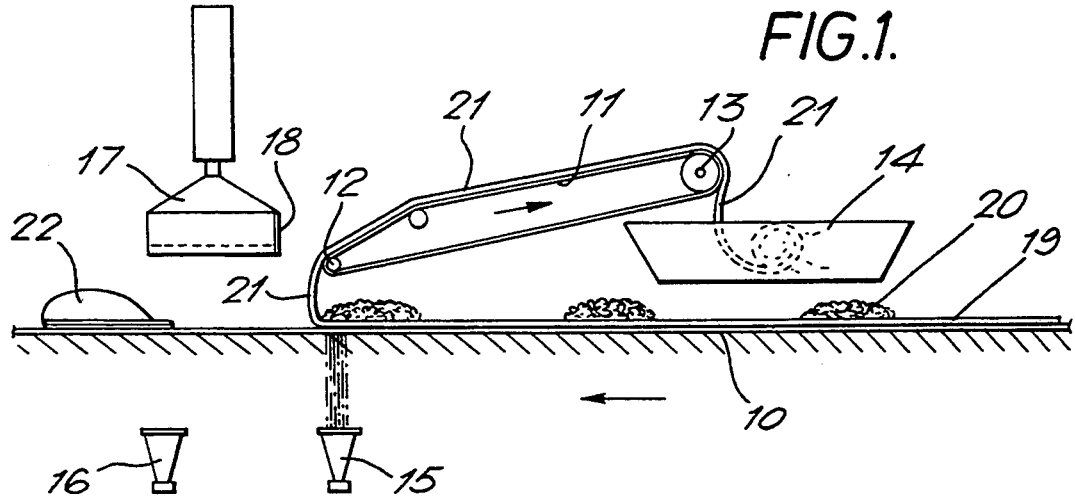
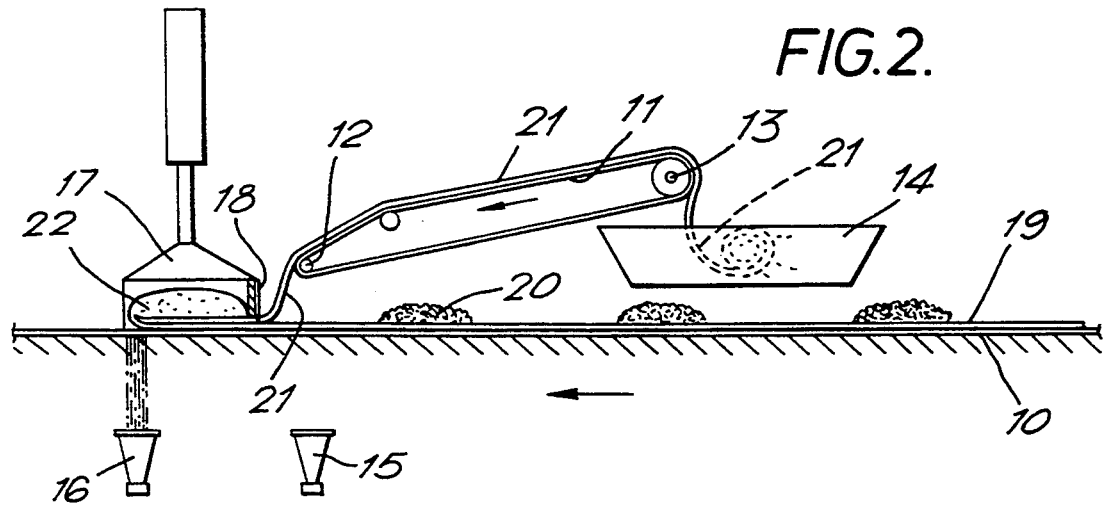
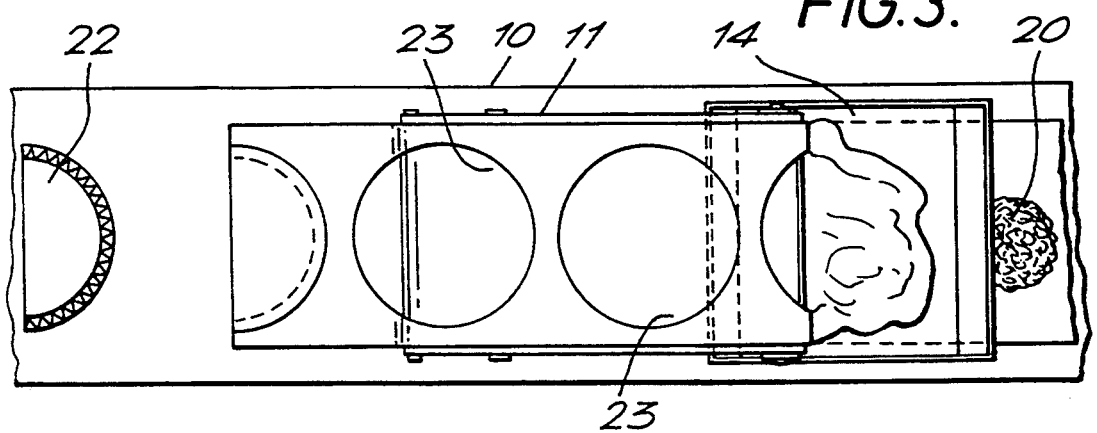

APPARATUS FOR PREPARING FOLDED ARTICLES FROM SHEET MATERIALS

BACKGROUND OF THE INVENTION

The present invention relates to a process and apparatus for the folding of sheets of plastic material such as dough sheets.

The automatic folding of sheeted dough for stuffed bakery products is normally carried out on a continuous conveyor by the use of a type of plough equipment, and this method works well for small products such as pirogues. However, for large sheets of dough having a width of above about 18 cm, e.g., such as sheets of dough used for the preparation of Calzone pizzas, the plough method is not satisfactory, and for certain types of dough, it does not work at all.

The methods so far proposed for folding dough sheets having a width above about 18 cm involve complicated machinery and the folding precision is easily disturbed by small variations of the dough consistency.

SUMMARY OF THE INVENTION

The present invention makes use of a rework dough conveyor which has been modified to enable motion in opposite directions, a rework dough conveyor being standard equipment of a bakery make-up line.

The present invention provides an apparatus for folding a sheet of plastic material which comprises a first conveyor for advancing a sheet of plastic material, a second conveyor positioned above the first conveyor and whose direction of motion is capable of being reversed so that in a first direction of motion, the advancing sheet of plastic material on the first conveyor is trained around the downstream edge of the second conveyor causing part of the sheet to recede along the second conveyor, and in a second direction of motion, the part of the sheet on the second conveyor advances so that it follows and overlaps the sheet on the first conveyor to form a folded sheet, and means for cutting the folded sheet.

The present invention also provides a process for folding a sheet of plastic material which comprises advancing the sheet of plastic material along a first conveyor, training the advancing sheet around the downstream edge of a second conveyor positioned above the first conveyor causing part of the sheet to recede along the second conveyor, reversing the direction of motion of the second conveyor causing the part of the sheet on the second conveyor to advance so that it follows and overlaps the sheet on the first conveyor to form a folded sheet and cutting the folded sheet at its upstream edge, and then reversing the direction of motion of the second conveyor causing the surplus sheet to be trained around its downstream edge and to recede along the second conveyor.

The "downstream edge" of the second conveyor is the edge which is downstream in relation to the advancing sheet on the first conveyor.

The plastic material may be, for example, dough which preferably has a width of above 18 cm, for instance from 18 to 25 cm.

DETAILED DESCRIPTION OF THE INVENTION

Advantageously, when the plastic material is a dough, a filling is positioned at regular intervals along the dough sheet advancing on the first conveyor. The first conveyor is conveniently substantially horizontal. Preferably, the first conveyor travels continuously.

The second conveyor is preferably an endless belt capable of reversing its direction of motion, and when the plastic material is a dough, it is advantageously a rework dough conveyor modified so that it is capable of reversing its direction of motion. Usually, positioned beneath the upstream edge of the second conveyor and above the sheet of plastic material on the first conveyor is a trough for collecting surplus dough.

When the plastic material is a dough and a portion of filling is positioned at regular intervals along the dough sheet advancing on the first conveyor, the reversal of the direction of motion of the second conveyor occurs when the leading edge of a filling portion on the advancing sheet reaches a position below the downstream edge of the second conveyor around which the portion of the advanced sheet downstream of the filling is trained. The position of the leading edge of the filling below the downstream edge of the second conveyor may be detected automatically, e.g., by means of a photocell from which a signal is sent via a control device to a driving means for actuating reversal of the direction of the motion of the second conveyor. When the advancing dough with a portion of filling has been folded and the upstream edge is positioned beneath the cutting means, the leading edge of the folded advancing dough may be detected, e.g., by means of a second photocell from which signals are sent via a control device, one to a cutting means to cut the folded and filled dough sheet at its upstream edge and the other to the driving means for actuating reversal of the direction of the motion of the second conveyor to withdraw the surplus dough which, forming the leading part of the advancing sheet on the first conveyor, is trained around the downstream edge of the second conveyor and recedes along it.

The cutting means may be a guillotine and preferably is provided with a semi-circular blade, with the two ends positioned downstream, which cuts out a semi-circular portion of the folded and filled dough sheet.

Advantageously, several apparatuses of the present invention may be arranged in parallel lanes on a production line.

The present invention is further illustrated by way of example only with reference to the accompanying drawings.

BRIEF DESCRIPTION OF THE DRAWINGS

FIG. 1 represents a diagrammatic sectional side view of an apparatus for producing Calzone pizzas.

FIG. 2 represents a similar view to that of FIG. 1 showing the folded pizza being cut.

FIG. 3 represents a top plan view of the apparatus shown in FIG. 1.

DETAILED DESCRIPTION OF THE INVENTION AND DRAWINGS

Referring to the drawings, the apparatus comprises a conveyor 10 having a first continuously moving horizontal conveying run which extends longitudinally for advancing a sheet of plastic material for folding and comprises a rework dough conveyor 11 which has a conveying run which is positioned above the conveying run of the first conveyor and which extends for a length from a first end, downstream edge 12, to a second end, upstream edge 13, for a length of the first conveyor conveying run. Thus, the first end is positioned at a position intermediate of first conveyor conveying run and hence, its upstream and downstream ends, and the first end is spaced a distance away from the first conveyor conveying run. Conveyor 11 is modified to reverse the direction of motion of its conveying run. The apparatus also comprises a trough 14, which is positioned for a remainder of the cut dough sheet from the second conveyor second end, and comprises photocells 15, 16 and a guillotine 17 provided with a semi-circular cutting knife 18. A sheet of dough 19 having a width of 20 cms, on top of which are placed portions of filling 20 at regular intervals, travels along the conveyor 10, and the portion 21 is trained around the downstream edge 12 of the rework dough conveyor 11 along which it travels.

In operation, the sheet of dough 19 carrying filling 20 portioned at regular intervals advances continuously along the conveyor 10 in the direction of the arrow shown in FIGS. 1 and 2 until it reaches a position below the downstream edge 12 of the rework dough conveyor 11 where the portion 21 of the sheet of dough 19 is trained around the downstream edge 12 and then recedes along the rework dough conveyor 11 in the direction of the arrow shown in FIG. 1.

When the downstream edge of a portion of filling 20 reaches a position below the downstream edge 12 of the rework dough conveyor 11, the photocell 15 is activated and sends a signal via a computer (not shown) to the driving means (not shown) of the rework dough conveyor 11 to reverse the direction of motion so that the portion 21 of the sheet of dough 19 advances along the rework dough conveyor 11 in the direction of the arrow shown in FIG. 2. This portion 21 follows the direction of the sheet of dough 19 and folds over the filling 20.

When the folding is completed, to give a folded filled dough 22, the photocell 16 is activated by the downstream edge of the folded dough and sends a signal via a computer to the guillotine 17 to cause the cutting knife 18 to descend and cut out about 65% of the folded dough from the main part from its upstream end in a semi-circular shape. At the same time, the photocell 16 sends a signal via the computer to the driving means of the rework dough conveyor 11 to reverse the direction of motion so that the portion 21 of surplus folded dough surrounding the cut out portion, and which is still attached to the advancing dough sheet 19, recedes and is transferred back to the rework dough conveyor 11 travelling in the direction of the arrow shown in FIG. 1. As the surplus dough unfolds and stretches out by reversing its direction of travel, the apparently semi-circular hole of the double layer of folded dough becomes a circular hole 23 in a single layer of dough on the rework conveyor 11. The cut and folded dough is transported away and the cycle is repeated with the next portion of filling on the sheet of dough.

I claim:

1. A conveyor apparatus for folding plastic articles comprising:

a first conveyor having a conveying run which extends longitudinally from an upstream run end to a downstream run end for advancing a sheet of plastic material for folding;

a second conveyor which is stationary and which has a conveying run which is positioned above the first conveyor conveying run and which extends for a length from a first end to a second end and for a length of the first conveyor conveying run so that the first end is at a position intermediate of the first conveyor conveying run upstream and downstream ends and wherein the first end is spaced a distance away from the first conveyor conveying run;

means for driving the second conveyor conveying run so that in a first direction of motion, the second conveyor conveying run travels in a direction towards the first end and so that in a second direction of motion, the second conveyor conveying run travels in a direction away from the first end; and cutting means positioned above the first conveyor conveying run intermediate of the first conveyor conveying run downstream end and the second conveyor conveying run first end for cutting a sheet of plastic material advanced lengthwise on the first conveyor conveying run so that a portion of a width between side edges of the sheet is separated from the sheet.

2. An apparatus according to claim 1 further comprising a trough positioned for receiving a remainder of the cut dough sheet traveling from the second conveyor conveying run second end.

3. An apparatus according to claim 1 wherein the means for cutting has a cutting blade which, with respect to the first conveyor conveying run, is semi-circular in shape.

* * * * *

UNITED STATES PATENT AND TRADEMARK OFFICE
CERTIFICATE OF CORRECTION

PATENT NO.   : 5,448,943
DATED        : September 12, 1995
INVENTOR(S)  : Slobodan MILOHANIC It is certified that error appears in the above-indentified patent and that said Letters Patent is hereby corrected as shown below:

Title page, in item [56] References Cited, U.S. PATENT DOCUMENTS, insert:

```
-- 3,947,597   3/1976   Kieffaber........426/27
   4,313,719   2/1982   Lundgren.........425/335
   4,618,498  10/1986   Thulin...........426/275--.
```

Signed and Sealed this

Twenty-sixth Day of December, 1995

Attest:

BRUCE LEHMAN

*Attesting Officer*            *Commissioner of Patents and Trademarks*